United States Patent [19]

Collombin et al.

[11] Patent Number: 5,200,134
[45] Date of Patent: Apr. 6, 1993

[54] METHOD AND APPARATUS FOR STRETCHING AND BLOWING UP A HEATED PREFORM

[75] Inventors: Andre-Marcel Collombin; Ennio G. Curetti, both of Grand-Lancy, Switzerland

[73] Assignee: Dynaplast SA, Grand-Lancy, France

[21] Appl. No.: 709,017

[22] Filed: May 31, 1991

[30] Foreign Application Priority Data

May 31, 1990 [CH] Switzerland ............... 1844/90

[51] Int. Cl.$^5$ ............................................. B29C 49/12
[52] U.S. Cl. ..................................... 264/532; 425/529
[58] Field of Search ................. 264/532; 425/529, 535

[56] References Cited

U.S. PATENT DOCUMENTS

| | | | |
|---|---|---|---|
| 4,128,383 | 12/1978 | Bond et al. | 425/529 |
| 4,196,165 | 4/1980 | Michel | 425/529 |
| 4,372,735 | 2/1983 | Collette | 425/529 |
| 4,566,871 | 1/1986 | Höne et al. | 425/529 |

Primary Examiner—Jan H. Silbaugh
Assistant Examiner—Catherine Timm
Attorney, Agent, or Firm—Young & Thompson

[57] ABSTRACT

For stretching blowing up a preheated preform, the preform is mechanically stretched longitudinally by a rod simultaneously to its blowing up, causing its transverse deformation. The displacement of the stretching rod is caused by a pneumatic piston fed by the same pressurized air supply as feeds the inside of the preform for its blowing up. Air is supplied under pressure inside the preform through a regulating valve which does not open until the stretching rod has contacted a closed end of the preform. An open end of the preform is sealed against a sleeve which is mounted for movement relative to but in the same direction as the rod. The pressurized air is applied against this sleeve to force the sleeve into sealing contact with the open end of the preform with a sealing pressure that varies as the pressure of the pressurized air. A piston on the sleeve rides in a cylinder into which the pressurized air is introduced on a side of the piston opposite the preform.

4 Claims, 2 Drawing Sheets

METHOD AND APPARATUS FOR STRETCHING AND BLOWING UP A HEATED PREFORM

The present invention has for its subject a machine for stretching-blowing containers in bi-oriented PET as well as a stretching-blowing method of preforms defined and claimed in the following.

The attached drawings show schematically and by way of example several embodiments of the present invention.

Figure 3:
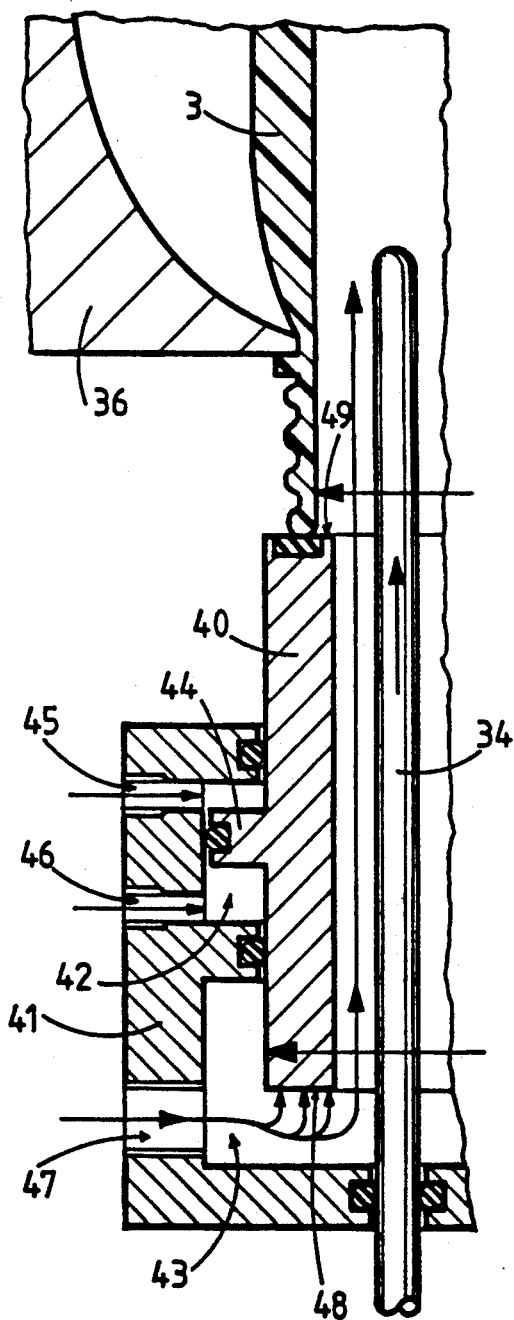
FIG. 3 shows a tightening device between the preform carrier and the inlet of the blowing air.

The blowing station comprises a device assuring the tightness between the preform carrier and the inlet of air under pressure which undergoes a force which is proportional to the blowing up pressure. This device is schematically shown at FIG. 3. It comprises a cylinder 40 axially displaceable coaxially to a preform in blowing position the lower edge of which, provided with a joint, enters in contact with the edge of the lower opening of the preform 3. This cylinder 40 slides in an air distributor 41 comprising an upper annular chamber 42 and a lower chamber 43, the lower wall of which is crossed in tight manner by the stretching rod 34. The cylinder 40 comprises an annular rib 44 sliding in tight manner in the upper chamber 42, dividing it in two and forming with it a double action jack, each of the portions of the chamber 42 presenting an opening 45, 46 which can be connected to a source of air under pressure or to the exhaust by means of a non illustrated valve.

Therefore putting the opening 46 in connection with the air pressure supply and the opening 45 in connection with the discharge, the cylinder 40 is brought into contact with the lower rim of the preform and is applied against it with a predetermined pressure which is sufficient to assure tightness.

The blowing up of the preform is obtained by feeding the lower chamber 43 through it opening 47 with air under pressure which is introduced into the preform through the central bore of cylinder 40. This blowing up air acts simultaneously on the annular lower section 48 and on the upper annular section 49 of smaller surface. Therefore during the blowing up, the force with which the cylinder 40 is applied against the lower rim of the preform 3 is equal to the force obtained by the air pressure feeding of chamber 42 increased by a force, directed in the same direction, proportional to the blowing up pressure resulting from the application of this pressure on the lower section 48 and the upper section 49 of the cylinder 40. The tightness between the cylinder 40 and the preform is thus automatically ensured whatever the pressure for the blowing up is and this without any regulation.

The blowing up station is characterized in that the force applied to the stretching rod 34 is directly proportional to the pre-blowing up pressure applied within the preform during its deformation in the stretching-blowing up phase. One obtains thus an autoregulation of the balance between the axial deformation and the transversal deformation of the preform.

Figure 1:
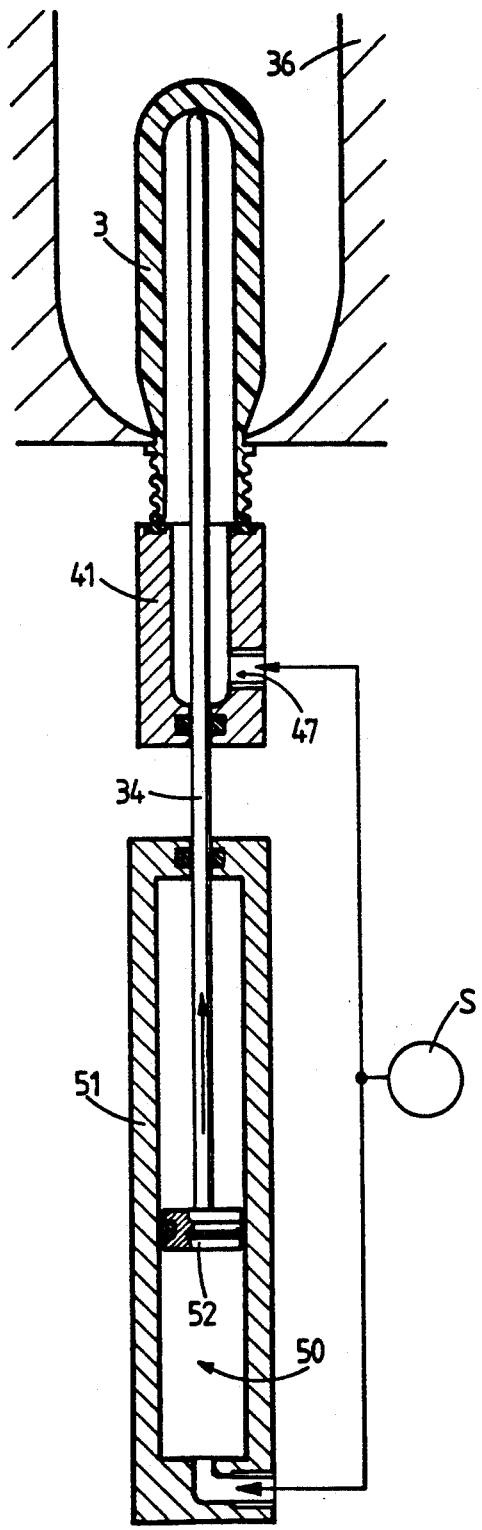
FIGS. 1 and 2 show two variants of the stretching-blowing method of preforms.

This is realized as shown schematically at FIG. 1 in that the feeding in air under pressure of the opening 47 of the distributor 41 feeding in air the inside of the preform is the same as the one feeding the lower chamber 50 of a jack 51 the piston 52 of which is fast with a stretching rod 34. Thus, as long as the stretching rod 34 has not reached its upper end stroke, its piston 52 coming in abutment against the jack 51, the force applied to the stretching rod 34 depends on the pressurized air supply S which feeds also the inside of the preform 3 for its blowing up.

Figure 2:
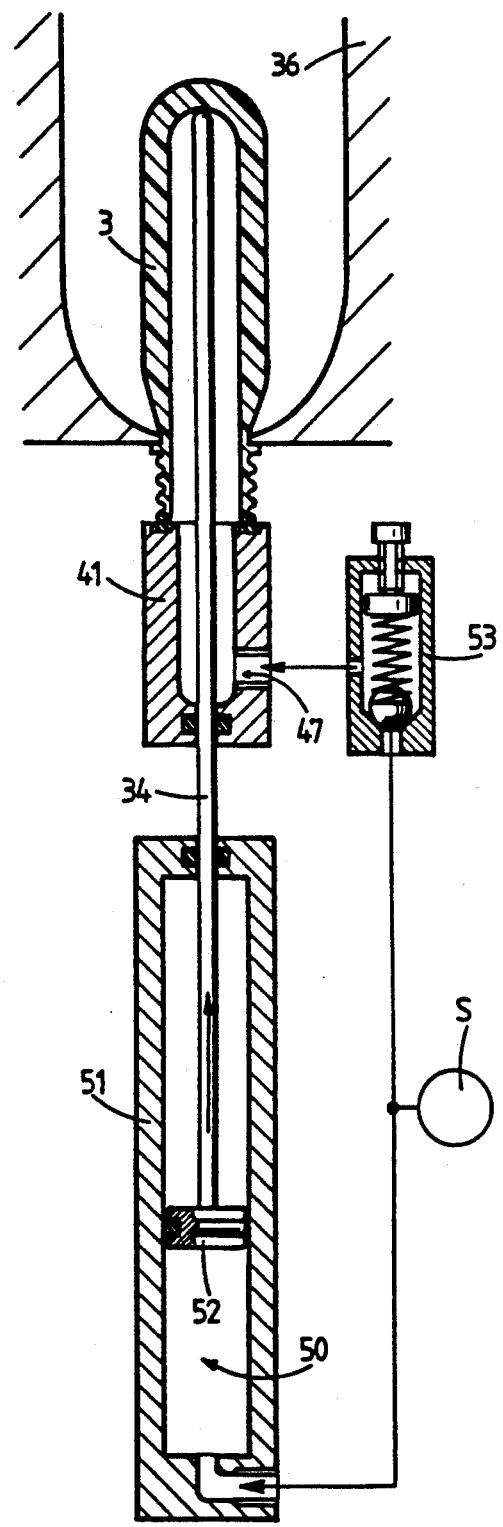

By introducing, as shown at FIG. 2, a setting valve 53 between the pressurised air supply S and the distributor 41, it is possible to bring automatically the stretching rod 34 into contact with a preform 3 before its blowing up and to define the resting force of the rod 34 against the material of the preform in an automatic manner.

Thanks to this system, one avoids during the stretching-blowing up phase, losing contact between the stretching rod and the preform. One avoids also any risk of piercing the preform with this stretching rod. Thanks to this design and to this conception one avoids any pressure regulation during the stretching-blowing up, this regulation being obtained automatically.

This mode of stretching-blowing up is particularly ingenious since the repartition of the blowing up pressure and the mechanical stretching pressure is automatically controlled by the preform itself which acts as the membrane of a pressure regulator. Therefore the control of the mechanical stretching pressure with respect to the pneumatic blowing up pressure is obtained automatically as a function of the particular characteristics, temperature, thickness, and so on, of the preform which is under work. This is essential for the realization of a stretching-blowing up machine which is simple and which cannot be misadjusted.

We claim:

1. Apparatus for stretching and blowing up a preheated preform, comprising means for inserting longitudinally into the preform a rod having a pneumatic piston thereon, means for supplying pressurized air from a single source of pressurized air both to the piston to advance the rod within the preform to stretch the preform and to feed air inside the preform to inflate the preform, a sleeve surrounding and slidable relative to and in the same direction as said rod into and out of sealing relation with an open end of said preform, and means to apply said pressurized air from said single source to said sleeve to force said sleeve against said open end of said preform with a force that varies as the pressure of said pressurized air.

2. Apparatus as claimed in claim 1, wherein the means to apply said pressurized air to said sleeve comprise a piston on said sleeve which rides in a cylinder into which said pressurized air is introduced on a side of said piston opposite said preform.

3. Method for stretching and blowing up a preheated preform comprising the steps of:
   providing a single pressurized air supply which feeds pressurized air to both a pneumatic piston and a regulating valve;
   feeding pressurized air furnished by said pressurized air supply to the piston thereby displacing a stretching rod into the preform until the stretching rod has contacted a closed end of the preform;
   after the rod has contacted the closed end, further feeding pressurized air to the piston to mechanically stretch the preform longitudinally and simultaneously feeding pressurized air from said pressurized air supply through the regulating valve to the inside of the preform to blow up the preform thereby transversely deforming the preform during the mechanical stretching using said single pressurized air supply.

4. Method of stretching and blowing up a preheated preform comprising the steps of:
   providing a single pressurized air supply which feeds pressurized air to a pneumatic piston, to the inside of the preform, and against a sleeve;
   feeding pressurized air furnished by said pressurized air supply to the piston thereby displacing a stretching rod into the preform until the stretching rod has contacted a closed end of the preform;
   feeding pressurized air furnished by said pressurized air supply against the sleeve to move said sleeve relative to and in the same direction as said rod until an open end of said preform is sealed against said sleeve and said sleeve is forced into sealing contact with said open end of said preform with a sealing pressure that varies as the pressure of said pressurized air; and
   after the rod has contacted the closed end of the preform and the preform has been selected against said sleeve, further feeding pressurized air to the piston to mechanically stretch the preform longitudinally and simultaneously feeding pressurized air from said pressurized air supply to the inside of the preform to blow up the preform thereby transversely deforming the preform during the mechanical stretching using said single pressurized air supply.

* * * * *